United States Patent
Vargas

(10) Patent No.: US 9,155,169 B2
(45) Date of Patent: Oct. 6, 2015

(54) DEVICE FOR SWITCHING ON AND OFF LIGHTING SYSTEMS OF A HOUSE OR A ROOM, OFFICES OR BUILDINGS, INTELLIGENTLY AND AUTOMATICALLY BY MEANS OF DETECTION, WITHOUT MANUAL INTERVENTION

(76) Inventor: Carlos Antonio Carreño Vargas, Santiago (CL)

( * ) Notice: Subject to any disclaimer, the term of this patent is extended or adjusted under 35 U.S.C. 154(b) by 214 days.

(21) Appl. No.: 14/002,936

(22) PCT Filed: Mar. 3, 2011

(86) PCT No.: PCT/CL2011/000017
§ 371 (c)(1),
(2), (4) Date: Sep. 3, 2013

(87) PCT Pub. No.: WO2012/116458
PCT Pub. Date: Sep. 7, 2012

(65) Prior Publication Data
US 2014/0035467 A1    Feb. 6, 2014

(51) Int. Cl.
*H05B 37/02*    (2006.01)

(52) U.S. Cl.
CPC ............. *H05B 37/0227* (2013.01); *Y02B 20/40* (2013.01); *Y02B 20/445* (2013.01)

(58) Field of Classification Search
USPC .................................................. 315/149–159
See application file for complete search history.

(56) References Cited

U.S. PATENT DOCUMENTS

| | | | | |
|---|---|---|---|---|
| 5,769,527 | A | * | 6/1998 | Taylor et al. ..................... 362/85 |
| 2010/0295455 | A1 | * | 11/2010 | Reed .............................. 315/152 |
| 2011/0069094 | A1 | * | 3/2011 | Knapp ........................... 345/690 |
| 2012/0206050 | A1 | * | 8/2012 | Spero ............................. 315/152 |
| 2013/0106304 | A1 | * | 5/2013 | Wee et al. ...................... 315/210 |
| 2014/0035437 | A1 | * | 2/2014 | Haga et al. ..................... 310/317 |

\* cited by examiner

*Primary Examiner* — Brandon S Cole
(74) *Attorney, Agent, or Firm* — Jeffrey Furr, Esq.; Furr Law Firm

(57) ABSTRACT

A device that allows to turn on and off the lights of a house or room, offices or buildings, intelligently and automatically by detection without people manual intervention, more specifically, this device is provided with means for detect people entry and exit, media controllers or people quantifiers for entering or leaving a place or a room, allowing in a way to avoid unintentional lights on neglect, and in other way obtain efficiency and power saving, which does not occur with current on and off systems.

12 Claims, 3 Drawing Sheets

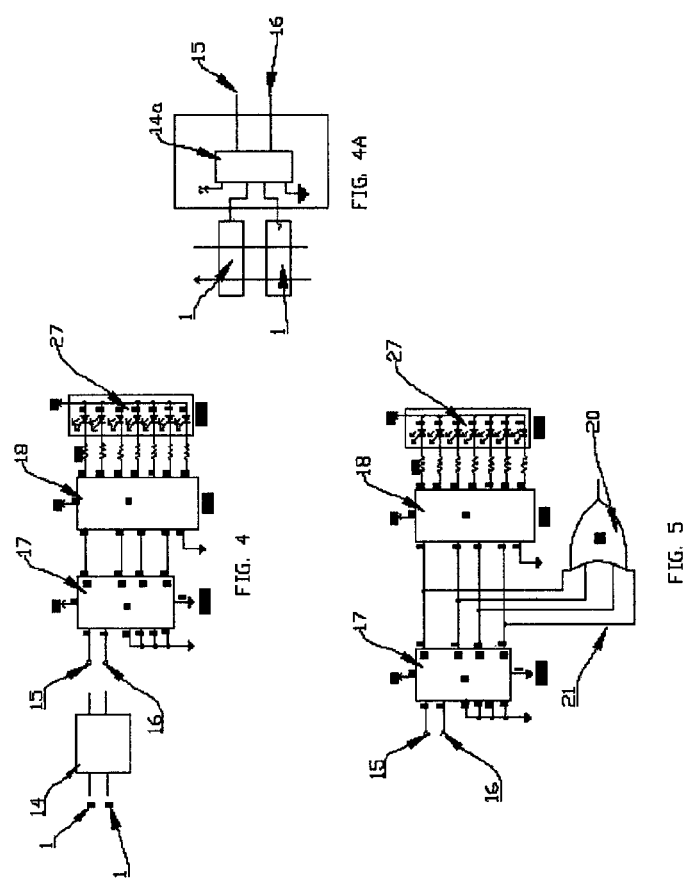

DEVICE FOR SWITCHING ON AND OFF LIGHTING SYSTEMS OF A HOUSE OR A ROOM, OFFICES OR BUILDINGS, INTELLIGENTLY AND AUTOMATICALLY BY MEANS OF DETECTION, WITHOUT MANUAL INTERVENTION

This invention relates a device for turning on and off the lights of a house or room, offices or buildings, intelligently and automatically by detection without people manual intervention, more specifically, this device is provided with means for detect people entry and exit, media controllers or people quantifiers for entering or leaving a place or a room, allowing in a way to avoid unintentional ligths on neglect, and in other way obtain efficiency and power saving, which does not occur with current on and off systems.

PRIOR ART

In regard to prior art, we can mention patent ES 2 018 118, which relates to an automatic light controller, than having aim the connection/disconnection of lighting or warning elements, associated to the presence of an individual in a site to control, essentially characterized by being constituted for a presence sensor and an illumination level detector, in functional association with the electronic circuit placing, in a way of signals, and associated power supply reference.

In claim two, states that one part of the electronic circuit level acts as a comparator for natural or environmental brightness, other part acts as a presence pulse generator, a third one for excitation timer for output circuit and a fourth one as excitatory for output element, that supplies voltage to the lamps in other indicator traces connected to the device.

Other invention patent is ES 424804, which refers to improvement control circuits for turning on automatic lighting installations, the class comprising a relay to control charge for circuits lighting or piloting a switching contact thereof, characterized by the fact to perform said developer control excitation or pilot from the circuit output of control circuit, which comprises, in parallel, in parallel, a load line in which are included on series the excitation winding of said developer, the emitter collector circuit from a transistor in changeover function and stabilization and biasing resistor, a control circuit formed by two resisted variables sections whose midpoint is connected to the base of the transistor, one of whose sections comprises an adjustable resistor the other a bias resistor and a photo resist device, being the end of two parallel lines or circuits connected to the output of a power supply circuit, which comprises connectable to an AC network input terminals, this means AC converters on low DC voltage to power maneuver circuit.

Even though existing devices or systems currently serving the proposed objectives, it is also true that are deficient, compared with the device of the invention, which presents the following advantages:

This system is more efficient because it quantifies persons entering and leaving a room, to turn on the lights and counts down to zero to turn them off.

It is cheaper and easy to install, can be sold in packs sold on retail companies know that any electrician would know to install.

It requires less power to operate since it detects people in the door frame, instead others must cover the entire room.

It is more efficient as the lights do turn off at being quiet people in a room.

It is further technological, more advanced than other systems being able to control entire buildings with this device.

To understand more clearly the invention, will be describe based on an exemplary embodiment, without this implying that the invention may be limited to this example or elements which may arise in obvious way, based on the drawings which form an integral part of this presentation, wherein:

FIG. 4 shows a driver circuit for digital counters.

FIG. 4A shows a detail from discriminator movement of persons direction, provided with a microcontroller.

FIG. 5 shows a circuit installed on counter output (CI 74193) an OR logic gate at connectors.

DESCRIPTION OF THE INVENTION

Figure 3:
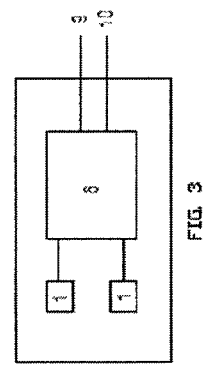
FIG. 3 shows a controller circuit or people entry quantizer.
Figure 1:
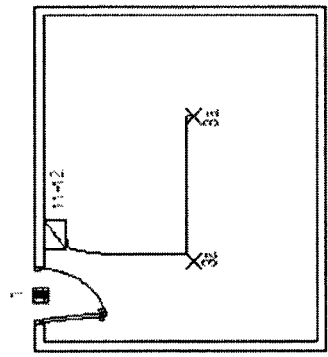
FIG. 1 shows a schematic of the device installation in a room.
Figure 2:
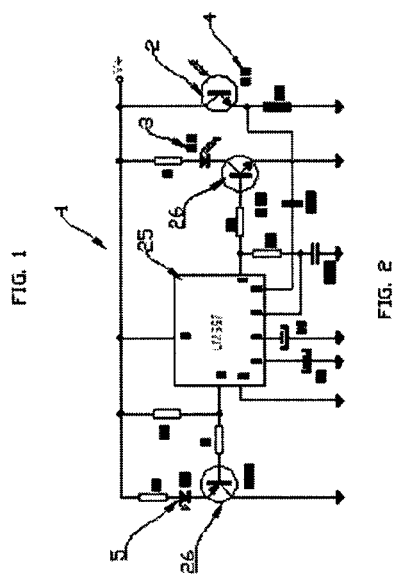
FIG. 2 shows a proximity sensor circuit.
Figure 6:
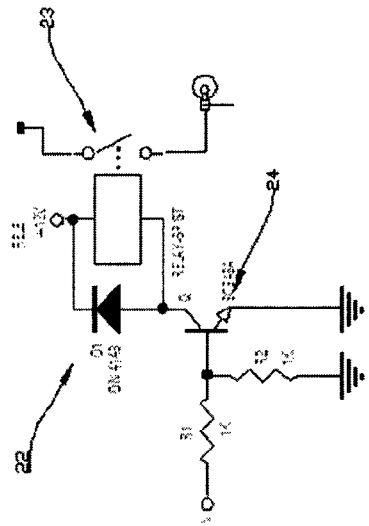
FIG. 6 shows the amplifier circuit design using a BC548 transistor and power and high voltage relay.
Figure 7:
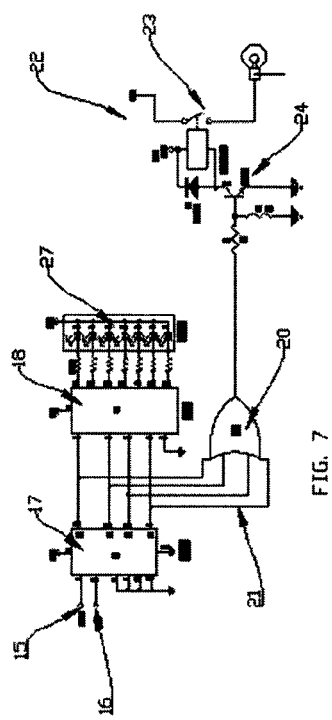
FIG. 7 shows controller circuit stage with the logic OR type with the connection to the amplifier circuit.

In attention to FIGS. 1-7, the invention of device that allows to turn on and off the lights of a house or room, offices or buildings intelligently and automatically by detection without manual intervention of persons, works at the moment the system counts one or more people in the room turn on the lights, which will turn off when the timer detects that all people have left the room, that is, the counter resets.

The device is composed of at least one proximity sensor set (1) whose function is to detect the entry or exit of people, the design of the sensor consists of a common way to feed a phototransistor (2) in this way a transmitter (IR Tx) (3) constantly emits an infrared signal, which, when interrupted by an object, generates a reflection that is captured by a receiver (Rx IR) (4), when this occurs the LED (5) engages at this point a small controller (17) which discriminates direction of the passage of people, both by an opto coupler or replacing LED (5) to connect directly to controller circuit (17).

According to the brightness of the room or sun effect, infrared filter is installed (identical to dark plate at the front of some remote controls), this is to prevent interference with external infrared signals.

According to the height of the door, using phototransistor (2) without lens detection range is approximately one meter, that is, placing it in a door of two meters, the proximity sensor (1) is capable of detecting people with a height greater than or equal to one point two meters. Using convex lenses in phototransistors (2) extends detection range up to five meters. Proximity sensors (1) consist of a transmitter (3) and one receiver (4) operating at the frequency supplied by the oscillator "LM567 (25)" as well as a semiconductors set to provide at integrated circuit and generally, the voltages required for correct operation of proximity sensors (1).

Some transistors (26) are responsible for generating the firing of the information given voltage, in order to have concrete information in black and white (yes or no), without these elements the circuit generates a graduate information, such as used to "measure" distances via infrared.

People sensor (6) is formed with two proximity sensors (1), a sensor controller (8), a signal output of persons (9) and an input signal of persons (10).

Output signal (9) and input signal (10) depend on the direction at time of device installation, if it were installed backwards, the output signal would be (10) and the input would be the (9).

Driver circuit (17) comprises two stages, the logic circuit (11) which is responsible for counting, display and discriminate whether to turn on or off the lights, and a power stage (12) which can be adjusted depending on the amount of light (3a) or appliances on automatically, depending on the amount of watts to provide, due to the small size of both, both can be contained inside the same "box".

In counter stage it forms a loop to digital meters, which is formed with an inlet (13), a discriminator (14), inlets DOWN (15) and UP (16) connects a circuit (17) integrated circuit 74193 is the counter (17), this can be replaced depending on the number of persons to count, whether four to fifteen persons, or eight bits for two hundred fifty-five persons, and so. Discriminator (14) consists of one or PIC microcontroller (14a) that have a program that identifies if one person enters or leaves depending on the order of activation of the proximity sensors.

7447 integrated circuit (18) is responsible driver for converting _and display information on a display (27).

To output the "there are people" with a score greater than zero, is installed at the counter output 74193 (17) a type logic gate OR (20) in the connectors, in this case QA, QB, QC and QD (21) (see FIG. 5), which should have as many inputs and outputs has the counter circuit (17) (this will depend on how many bits is the counter).

In this way logic gate (20) will have a positive output when the count of people is different from zero.

In the power stage a circuit (22) is only responsible for delivering or not delivering power using a relay (23).

Such circuit (22) as logic gates (20) have low power outputs as their function is no power supply but information, it connects to a small transistor amplifying circuit using the common use BC548 transistor (24), which elevates the current to be able to operate the power relay_and high voltage (23), which is voltage and amperage as needed depending on the amount of watts to consume.

Digital counter circuit (17), add or subtract 1 digit when activated any of its inputs (up/down), the information is provided in binary digital form through its 4 output pins (in this case 4 bits).

Note: binary conversion table, 1 involves output voltage_ _, 0 means zero output voltage. See conversion table:
0000=0
0001=1
0010=2
0011=3
0100=4
0101=5
0110=6
0111=7
1000=8
1001=9
1010=10
1011=11
1100=12
1101=13
1110=14
111=15

7447 integrated circuit (18) is a driver receives a binary digital type entry and transforms it so that it may be connected to a digital LED display.

The OR logic gate (20), if any of its inputs is a 1, the output is a 1, this is why when there is a person the circuit is activated, see binary table.

I claim:

1. Device that allows to turn on and off the lights of a house or room, offices or buildings, intelligently and automatically by detection without people manual intervention, more specifically, this device is provided with means for detect people entry and exit, media controllers or people quantifiers for entering or leaving a place or a room, allowing in a way to avoid unintentional lights on neglect, and in other way obtain efficiency and power saving. CHARACTERIZED because the device is formed with at least one proximity sensor set (1), to detect the entry or exit of persons, made with a phototransistor (2) with an emitter (IR Tx) (3) that constantly emits a infrared signal, which when is interrupted for an object generates a reflex detected by a receiver (Rx IR) (4), upon this is lit LED (5), then it's coupled to a counter circuit (17) that discriminate the people's movement direction, both by an opto coupler or replacing LED (5), to connect directly to counter circuit (17) also has an infrared filter to prevent external interference with infrared signals, said proximity sensors (1) consist of a Tx and Rx to operating frequency given by the oscillator "LM567 (25)" as well as a semiconductors set to provide for the integrated circuit and generally, of the voltages required for correct operation of proximity sensors (1), these also have transistors (26), which are responsible for generating the information firing for given voltage in order to have concrete information black and white (yes or no), and it is embedded to an integrated circuit 7447 (18) corresponds to a converting driver responsible for converting and displaying information on a display (27).

2. A device that allows to turn on and off the lights of a house or room, according to claim 1, CHARACTERIZED because the counter circuit (17) is provided with phototransistors convex lenses (2) which expands the detection range.

3. Device that allows to turn on and off the lights of a house or room, according to claim 1, CHARACTERIZED because the people sensor (6) is formed with two proximity sensors (1), a counter of sensors (8), an out persons signal (9) and an input persons signal (10), the output signal (9) and input signal (10) depends on the direction at the time of device installation, if it were installed backwards, the output signal would be (10) and the input would be the (9).

4. Device that allows to turn on and off the lights of a house or room, according to claim 3, CHARACTERIZED because the discriminator (14) consists of a PIC (14a) or micro counter that haves a program that identifies if one person enters or leaves depending on the order of proximity sensors activation.

5. Device that allows to turn on and off the lights of a house or room, according to claim 3, CHARACTERIZED because 7447 integrated circuit (18) is a responsible driver to convert and display information on a display (27).

6. Device that allows to turn on and off the lights of a house or room, according to claim 1, CHARACTERIZED because the counter circuit consists of two stages, the logic circuit (11) which is responsible for counting, display and discriminate whether to turn on or off lights, and a power stage (12) which can be adjusted depending on the amount of light (3a) or automatically powered devices, depending on the number of watts to be provided, because the small size of both elements, both can be contained inside the same "box".

7. Device that allows to turn on and off the lights of a house or room, according to claim 1, CHARACTERIZED because the quantifier is formed by a digital counter circuit, which is formed with an inlet (13), a discriminator (14), inlets DOWN (15) and UP (16) and connects to the 74193 integrated circuit (17).

8. Device that allows to turn on and off the lights of a house or room, according to claim 1, CHARACTERIZED because the discriminator (14) consists of a PIC (14*a*) or micro counter that haves a program that identifies if one person enters or leaves depending on the order of proximity sensors activation.

9. Device that allows to turn on and off the lights of a house or room, according to claim 1, CHARACTERIZED because 7447 integrated circuit (18) is a responsible driver to convert and display information on a display (27).

10. Device that allows to turn on and off the lights of a house or room, according to claim 1, CHARACTERIZED because to emit the "there are people" signal with a score bigger than zero, have installed in the counter output 74193 (17) a logic gate OR type (20) into the connectors, in this case, QA, QB, QC and QD (21) (see FIG. 5), which should have as many inputs as outputs has the counter circuit (17) (it will depend on how many bits is the counter) and in this way a logic gate (20) will have a positive output when the persons count is different to zero.

11. Device that allows to turn on and off the lights of a house or room, according to claim 10 CHARACTERIZED because logic gate (20) is connected to a circuit (22) for power delivery, only responsible for delivering or not delivering power using a relay (23), said circuit (22) as logic gates (20) have low power outputs as its function to provide information delivering power, it connects to a small amplifier circuit using the BC548 transistor for common use (24), which raises the power to be capable of triggering the relay and high voltage (23), which is voltage and amperage as needed depending on the amount of watts to consume.

12. Device that allows to turn on and off the lights of a house or room, according to claim 1 CHARACTERIZED because logic gate (20) is connected to a circuit (22) for power delivery, only responsible for delivering or not delivering power using a relay (23), said circuit (22) as logic gates (20) have low power outputs as its function to provide information delivering power, it connects to a small amplifier circuit using the BC548 transistor for common use (24), which raises the power to be capable of triggering the relay and high voltage (23), which is voltage and amperage as needed depending on the amount of watts to consume.

\* \* \* \* \*